Patented Jan. 16, 1951

2,537,993

UNITED STATES PATENT OFFICE 2,537,993

QUATERNARY AMMONIUM COMPOUND

William S. Gump, Upper Montclair, and Edward Joseph Nikawitz, Passaic, N. J., assignors to The Givaudan Corporation, New York, N. Y., a corporation of New Jersey No Drawing. Original application February 6, 1946, Serial No. 645,963. Divided and this application July 20, 1949, Serial No. 105,887

1 Claim. (Cl. 260—457)

This invention relates to novel quaternary ammonium compounds, and to a process for preparing them.

These novel chemicals may be represented by the following general structural formula:

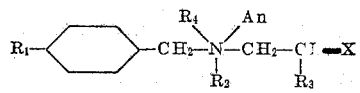

wherein $R_1$ is a member selected from the group consisting of H and alkyl, $R_2$ is a member selected from the group consisting of alkyl, aryl, aralkyl, aralkylene, cycloalkyl and haloalkylene radicals, $R_3$ is a member selected from the group consisting of H and $CH_3$, $R_4$ is a lower alkyl radical, X is halogen and An represents an anion selected from the group consisting of anions of inorganic and organic acids.

As some specific members of this series of novel chemicals, the following may be noted:

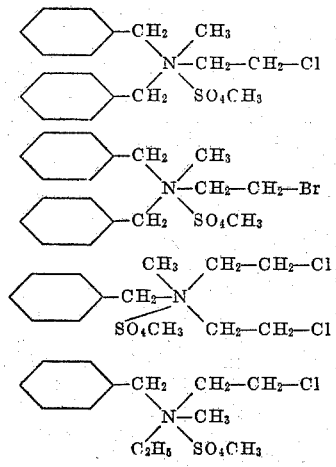

and

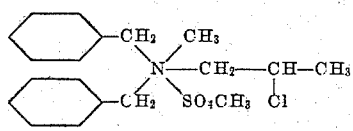

In general, the novel quaternary compounds may be prepared by reacting the corresponding amines with a quaternizing agent, such as dimethyl sulfate or ethyl bromide.

The new quaternary ammonium compounds of this invention are crystalline solids or viscous liquids. They are soluble in water and in polar organic solvents.

The novel materials of this invention exhibit unexpected and desirable medicinal properties. For example, they are excellent sympatholytic and adrenolytic agents, and also protect against harmful effects on the heart in cyclopropane anesthesia. For therapeutic purposes the novel quaternary compounds may be administered orally or parenterally, and may be employed in capsules or in solutions.

In addition to their therapeutic properties, the quaternary compounds of this invention are useful in organic chemical synthesis.

In order to illustrate this invention more fully but without thereby limiting it, the following examples are given.

EXAMPLE 1

*Beta-chloroethyl-dibenzyl-methyl-ammonium methosulfate*

To 610 grams of monoethanolamine, 1265 grams of benzyl chloride are added under stirring during five hours at a temperature of 100°–110° C. Stirring and heating at 100°–110° C. is continued for five more hours.

After cooling to about 70° C., a solution of 400 grams of sodium hydroxide in 600 cc. of water was gradually added under stirring and the mixture was heated in a boiling water bath for one hour. After cooling to room temperature, the contents were extracted with 800 cc. of benzene. The benzene solution was separated, washed with 1000 cc. of water, dried with anhydrous sodium sulfate and filtered. The benzene was removed by distillation first under atmospheric pressure to a temperature of 90° C., and finally under vacuum of about 30 mm. mercury to about 100° C. The residual oil was then distilled at a vacuum of 5 mm. mercury, and 848 grams of the desired material, boiling at 185°–192° C., were obtained. The liquid solidified on standing to a crystalline solid, congealing at 43° C.

A solution of 482 grams of the above dibenzyl aminoethanol in 500 cc. of chloroform was cooled in an ice bath, and under stirring, a solution of 276 grams of thionyl chloride in 300 cc. of chloroform was added during two hours. Stirring was then continued for three hours under cooling. The reaction mixture was allowed to stand over night. The chloroform was distilled off under atmospheric pressure except near the end when vacuum was employed, and the crystalline mass was recrystallized from 700 cc. of ethanol containing 10 grams of decolorizing carbon. After filtration, 410 grams of white crystals of dibenzyl-beta-chloroethylamine hydrochloride, melting at 194°–195° C., were obtained; addition of ether to the mother liquor yielded a second crop of 90 grams (melting point 192°–194° C.).

300 grams of finely powdered dibenzyl-beta-chloroethylamine hydrochloride, prepared in accordance with the above, were vigorously stirred for a half hour with 500 cc. of a saturated aqueous solution of potassium carbonate. The mixture was shaken with 400 cc. of benzene and the resulting benzene-containing layer was dried with anhydrous sodium sulfate, filtered, and the solvent was removed by distillation. The residual oil was distilled under high vacuum.

The desired dibenzyl-beta-chloroethylamine (210 grams) was obtained in the form of a yellowish oil, boiling at 176°–180° C. at 4 mm. Hg.

13 grams of dibenzyl-beta-chloroethylamine, 14 grams of dimethyl sulfate and 40 cc. of specially denatured #30 alcohol were boiled for 4 hours. The contents were passed into 200 cc. of ethyl ether under stirring, and then permitted to stand for a half hour. The ether was decanted and the residue was twice washed with 50 cc. of ethyl ether by thorough shaking followed by decantation of the supernatant liquid after settling. The resulting viscous oil was dried under high vacuum (4 mm. Hg) at 90° C. for one hour.

21 grams of a viscous brown oil were obtained. It is soluble in water, alcohol, acetone and propylene glycol, and insoluble in aromatic and petroleum hydrocarbons.

EXAMPLE II

*Dibenzyl-beta-bromoethyl-methyl ammonium methosulfate*

Melted dibenzyl aminoethanol (48 grams) prepared in accordance with Example I, were slowly added to 90 cc. of ice cold hydrobromic acid ($d=1.42$). The mass became solid and another 90 cc. of hydrobromic acid were added. The mixture was then refluxed for three hours and about 50 cc. liquid distilled off. After refluxing for another three hours, the reaction product was concentrated to about 50 cc. and twice shaken out with ether (100 cc. each). The residue was dried in vacuo and twice recrystallized from alcohol (50 cc.) under addition of ether until crystals separated. White crystals of dibenzyl-beta-bromoethylamine hydrobromide (38 grams) of melting point 176°–178° C. were obtained. The analysis showed 41.6% Br (theory 41.8%).

In accordance with the procedure of Example I, dibenzyl-beta-bromoethylamine (boiling point 177°–178° C. at 3 mm. Hg) was obtained from its hydrobromide (prepared in accordance with the above).

In accordance with the procedure of Example I, dibenzyl-beta-bromoethyl-methyl ammonium methosulfate, in the form of a brownish, very viscous liquid, was obtained from its amine, prepared as above. This liquid quaternary compound is soluble in water, methyl alcohol, ethyl alcohol, acetone and propylene glycol, but is insoluble in ethyl ether, benzene and petroleum ether.

EXAMPLE III

*Benzyl-di-beta-chloroethyl-methyl ammonium methosulfate*

Benzyl chloride (190 grams) was slowly dropped under stirring into diethanolamine (315 grams), heated to 100° C. During the addition which took about one hour, the temperature rose to 125° C. Stirring was continued at this temperature for eight hours. Sufficient saturated potassium carbonate solution to neutralize the formed hydrochlorides was added and the mixture stirred for thirty minutes at 90° C. An oil separated. Extraction with isopropyl ether (500 cc.) dissolved only small amounts of this oil. The oil and the isopropyl ether fraction were combined and enough ethanol added to obtain a homogeneous mixture. This solution was dried over anhydrous sodium sulfate and distilled. After removal of the solvent, the oil was distilled through a Vigreaux column in vacuo. The fraction boiling at 74°–183° C. at 6 mm. was redistilled and 162 grams of pure di-beta-hydroxyethyl-benzylamine, boiling point 176°–177° C., were obtained.

Into 97 grams of di-beta-hydroxyethyl-benzylamine, dissolved in 100 cc. of chloroform, and cooled with water, were dropped in under stirring 120 grams of thionyl chloride dissolved in 100 cc. of chloroform. The same procedure as described for benzyl-ethyl-beta-chloroethylamine hydrochloride was applied except that ethyl ether was used in place of petroleum ether, and 115 grams of white, crystalline di-beta-chloroethyl benzylamine hydrochloride, melting at 148°–150° C., were obtained.

In accordance with the procedure of Example I, di-beta-chloroethyl benzylamine (boiling point 148°–150° C. at 4 mm. Hg) was obtained from its hydrochloride (prepared as above).

In accordance with the procedure of Example I, benzyl di-beta-chloroethyl-methyl-ammonium methosulfate, in the form of a brownish, very viscous liquid, was obtained from its amine, prepared as above. This liquid quaternary compound is soluble in water, methyl alcohol, ethyl alcohol, acetone and propylene glycol, but is insoluble in ethyl ether, benzene and petroleum ether.

EXAMPLE IV

*Benzyl-ethyl-beta-chloroethyl-methyl-ammonium methosulfate*

Benzyl chloride (253 grams) were dropped into ethyl monoethanolamine (356 grams) during two hours under stirring at a temperature of 100° C., and the mixture was kept at this temperature for six hours. A saturated solution of 150 grams of potassium carbonate was then added, and after stirring and cooling the reaction mixture was extracted with 500 grams of isopropyl ether. The isopropyl ether solution was dried over anhydrous sodium sulfate and distilled. After removal of the isopropyl ether, the residue was distilled at 10 mm. of Hg through a small Vigreaux column. Obtained were 143 grams, boiling point 127°–135° C. and refractive index at 20°, 1.5175 and 220 grams, boiling point 135° C. and refractive index 1.5190. The two fractions were combined for the preparation of the beta-chloroethyl derivative.

A solution of 190 grams of thionyl chloride in 100 cc. of chloroform was dropped under stirring into a solution of 269 grams of the above benzyl ethylamino ethanol in 300 cc. of chloroform which mixture was cooled in an ice bath. The time for the addition was about two hours; stirring was then continued for three hours under cooling. The reaction mixture was allowed to stand over night. The chloroform was then distilled off on the water bath, applying low vacuum at the end. 100 cc. of ethanol were added and the mixture evaporated to dryness in vacuo. The crystalline residue was dissolved in 300 cc. of isopropanol and the solution refluxed for about half an hour under the addition of 5 grams decolorizing carbon. To the filtered and cooled solution, petroleum ether (boiling point 60°–90° C.) was added until crystals started to separate. The crystals of benzyl ethyl-beta-chloroethylamine hydrochloride formed after standing were filtered, washed with petroleum ether and dried (300 grams, melting point 154°–155° C.).

In accordance with the procedure of Example I, benzyl ethyl-beta-chloroethylamine (boiling point 114°–115° C. at 4 mm. Hg) was obtained from its hydrochloride (prepared as above).

In accordance with the procedure of Example I, benzyl-ethyl-beta-chloroethyl-methyl ammonium methosulfate, in the form of a brownish, very viscous liquid, was obtained from its amine, prepared as above. This liquid quaternary compound is soluble in water, methyl alcohol, ethyl alcohol, acetone and propylene glycol, but is insoluble in ethyl ether, benzene and petroleum ether.

EXAMPLE V

*Dibenzyl-beta-chloropropyl-methyl ammonium methosulfate*

Into 150 grams of isopropanolamine, heated to 100° C. were dropped under stirring 253 grams of benzyl chloride during two hours; the mixture was then kept at 100°–110° C. for five hours. A concentrated solution of 90 grams of sodium hydroxide was then added and the reaction product extracted with 600 grams of benzene. The benzene solution was washed with water, dried over anhydrous sodium sulfate and distilled. After removal of the benzene, the residual oil was distilled in vacuo (5 mm. of Hg) and 168 grams of dibenzylamino isopropanol, boiling point 170°–175° C., were collected.

Dibenzylamino isopropanol (127 grams) were dissolved in 100 cc. of chloroform and cooled in an ice-salt bath. To this solution, 70 grams of thionyl chloride in 100 cc. of chloroform were added under stirring during two hours. Stirring was then continued for another three hours under cooling. The reaction mixture was allowed to stand over night. The chloroform was distilled off, applying low vacuum at the end. Ethanol (50 cc.) was added and the mixture evaporated to dryness in vacuo. The crystalline residue was dissolved in 80 cc. of isopropanol and the solution purified by addition of 2 grams of decolorizing carbon and refluxing for thirty minutes. The filtered and cooled solution was brought to crystallization by adding isopropyl ether. 92 grams of white crystals, melting at 165°–167° C., were obtained. This is dibenzyl-beta-chloropropylamine hydrochloride.

In accordance with the procedure of Example I, dibenzyl-beta-chloropropylamine (boiling point 176°–177° C. at 3 mm. Hg) was obtained from its hydrochloride (prepared as above).

In accordance with the procedure of Example I, dibenzyl-beta-chloropropyl methyl ammonium methosulfate, in the form of a brownish, very viscous liquid, was obtained from its amine, prepared as above. This liquid quaternary compound is soluble in water, methyl alcohol, ethyl alcohol, acetone and propylene glycol, but is insoluble in ethyl ether, benzene and petroleum ether.

This application is a division of our co-pending application, Ser. No. 645,963, filed February 6, 1946, now Patent No. 2,504,977.

The foregoing illustrates the practice of this invention, which however, is not to be limited thereby but is to be construed as broadly as permissible in view of the prior art and limited solely by the appended claim.

We claim:

The novel chemical compound having the structural formula, dibenzyl-beta-bromoethyl-methyl ammonium methosulfate.

WILLIAM S. GUMP.
EDWARD JOSEPH NIKAWITZ.

No references cited.